Patented Apr. 3, 1923.

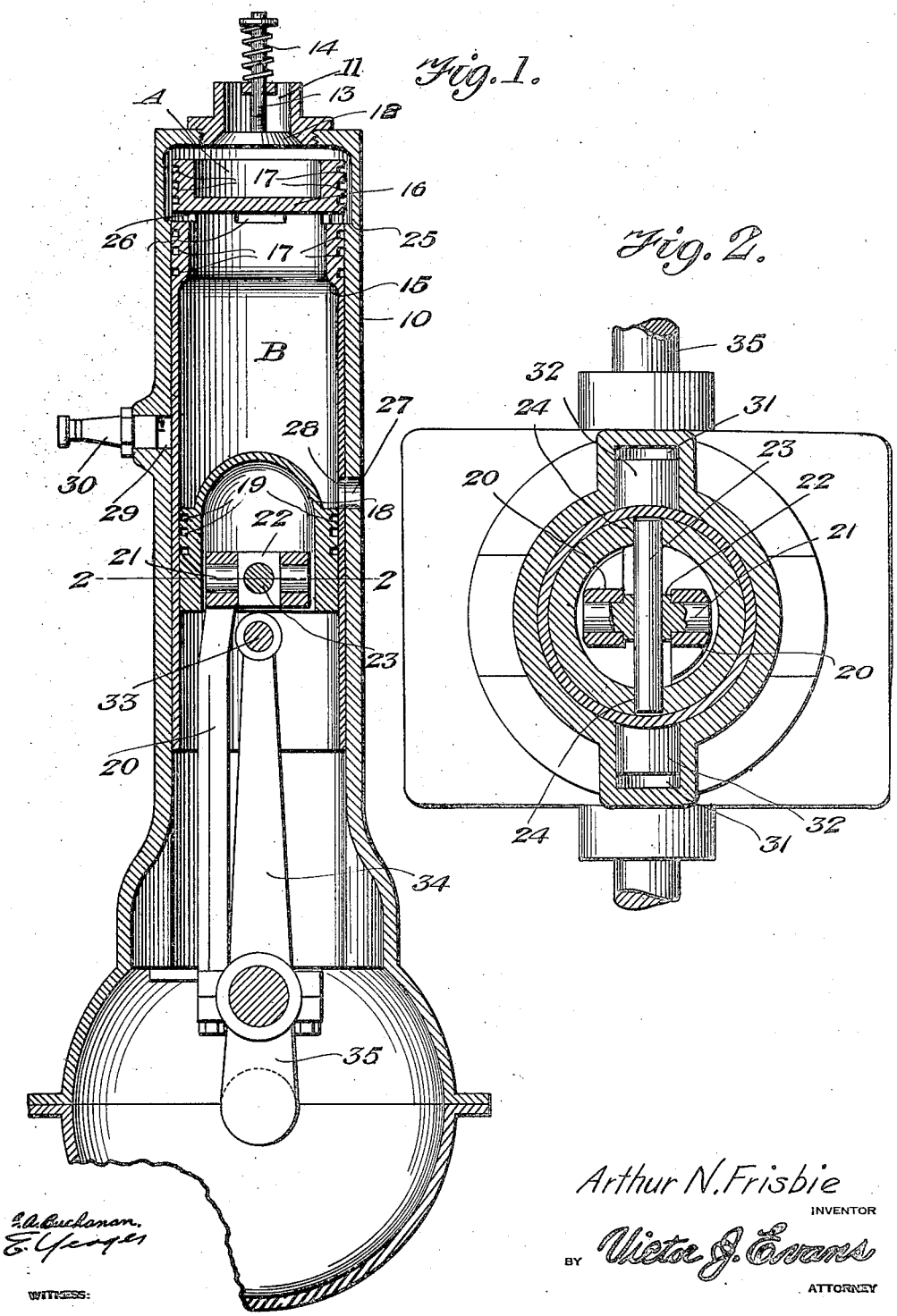

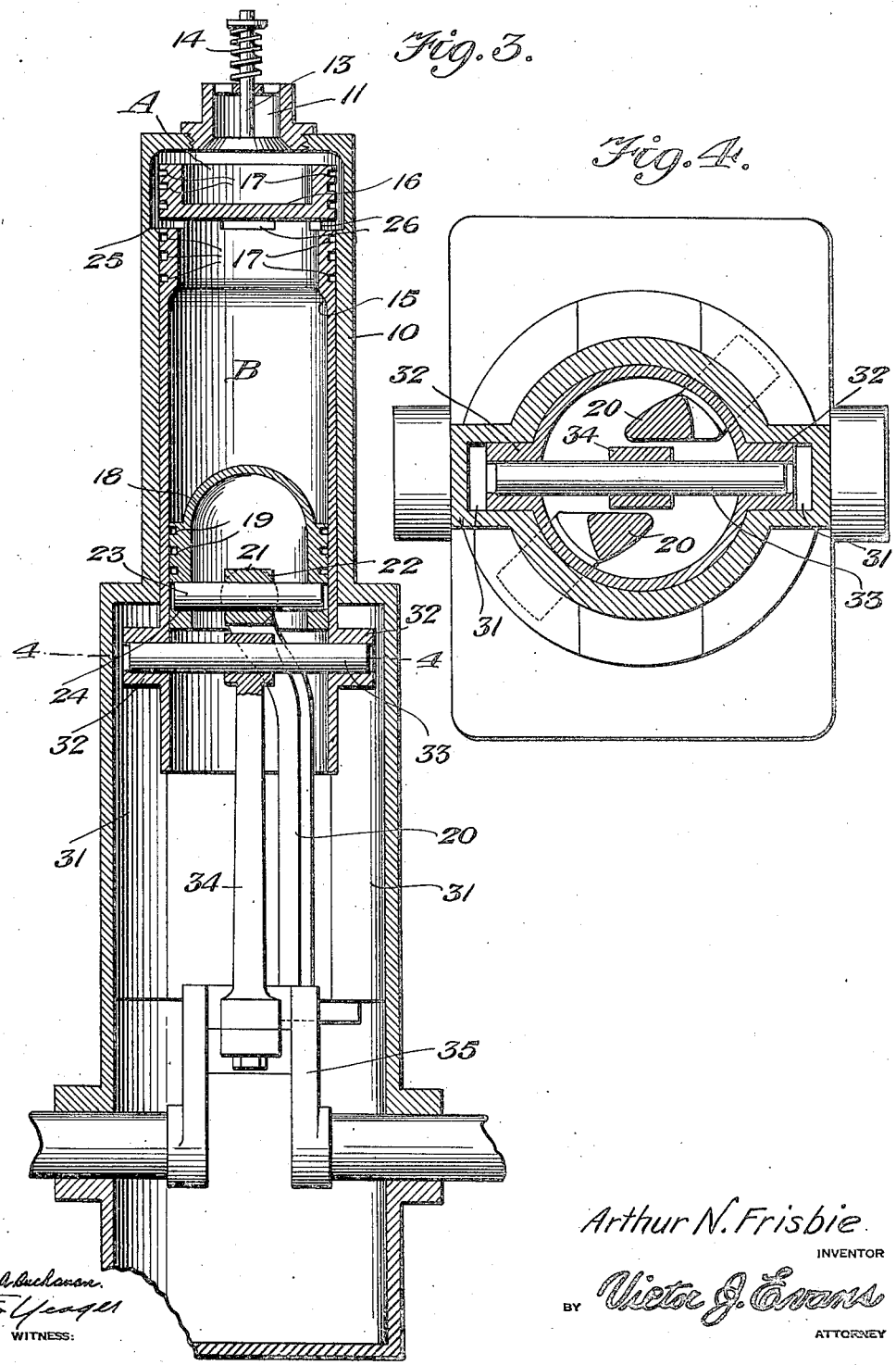

1,450,801

UNITED STATES PATENT OFFICE.

ARTHUR N. FRISBIE, OF UTICA, NEW YORK.

INTERNAL-COMBUSTION ENGINE.

Application filed May 7, 1920. Serial No. 379,593.

*To all whom it may concern:*

Be it known that I, ARTHUR N. FRISBIE, a citizen of the United States of America, residing at Utica, in the county of Oneida and State of New York, have invented new and useful Improvements in Internal-Combustion Engines, of which the following is a specification.

This invention relates to internal combustion engines, and comprehends a construction wherein the reciprocating piston is hollow and closed at both ends, the piston being movable with relation to one of its end closures, and constituting a combined compression and firing chamber.

One of the important objects of the invention resides in the provision of a valve for controlling the inlet opening through the cylinder, the valve being arranged to be opened by the suction of the piston; the disposition of the valve being such that it is not subjected to the heat of the combustion, which fact allows the use of a valve of larger diameter so that it is rendered very sensitive to open with a minimum of pressure reduction, and closed with a minimum of pressure.

Another object of importance resides in the novel construction and arrangement of parts, by means of which the explosive mixture is rapidly transferred from the cylinder to the piston under compression, and the products of combustion as a unit forced from the piston through the exhaust port in a manner which results in a nearly perfect scavenging of the piston, with little or no possibility of any of the combustible mixture being mixed with the burned gases, or its escape through the exhaust port irrespective of the speed of the motor.

In carrying out the invention, the stationary closure for the lower end of the piston is arranged within the latter, and its position regulates the compression space of the piston, this closure being mounted for universal movement, or in other words in a manner so that it automatically centers within the piston.

The nature and advantages of the invention will be better understood when the following detailed description is taken in connection with the accompanying drawings, the invention residing in the construction, combination and arrangement of parts as claimed.

In the drawings forming part of this application like numerals of reference indicate similar parts in the several views and wherein:—

Figure 1 is a vertical sectional view through one of the cylinders of the motor and its associated parts.

Figure 2 is a transverse sectional view taken on line 2—2 of Figure 1.

Figure 3 is a view similar to Figure 1 taken at right angles thereto.

Figure 4 is a transverse sectional view taken on line 4—4 of Figure 3.

Referring to the drawings in detail, 10 indicates a cylinder having an opening in the upper end thereof through which opening the cylinder communicates with the carbureter, the opening being indicated at 11, and controlled through the instrumentality of a valve 12 having a stem 13 about which is arranged a spring 14 utilized for normally holding the valve seated. The piston is indicated at 15, and is hollow as shown and closed at both ends. The upper end of the piston is closed by an end wall 16 forming an integral part of the piston, but which end wall is arranged an appreciable distance below the upper end of the piston 15 for a purpose to be hereinafter described. The piston 15 is provided with grooves 17 arranged in series above and below the end wall 16 for the reception of suitable packing rings. The opposite end of the piston 15 is sealed by a stationary closure 18 which is arranged within the piston and provided with grooves 19 for the reception of suitable packing rings. The closure 18 is supported by bracket arms 20 which are suitably secured to the same base as that supporting the cylinder 10. The upper extremities of the arms 20 are suitably spaced and formed to provide bearings for a transverse pin 21 the latter having its intermediate portion arranged between the extremities of the arms 20 and squared as at 22 and provided with a transverse bore for the reception of a pin 23 terminally connected to the stationary closure 18 as at 24. The pin 21 is afforded limited rotation within the bearings in the arms 20, while the pin 23 is also susceptible of a slight rotation within the pin 21, these facts or assemblage of parts permitting of a slight universal movement for the stationary closure 18, so that the latter will automatically center or line itself within the piston 15.

The inner diameter of the cylinder 10 from the point 25 to the top thereof is of slightly increased diameter to provide within the space between the upper end of the piston and the adjacent end of the cylinder, a compression chamber A for the combustible mixture admitted to the cylinder 10 through the intake 11. Immediately beneath the end 16 of the piston, are transfer openings 26 circumferentially disposed and equidistantly spaced, these openings and the position of the parts shown in Figure 1 establishing communication between the compression chamber A of the cylinder 10 and the interior of the piston 15, which interior constitutes a combined compression and firing chamber B. The cylinder 10 is provided with an exhaust port 27 with which the exhaust port 28 of the piston is adapted to register when the piston is in its uppermost position within the cylinder 10. At the opposite side of the cylinder an opening 29 is provided for the reception of a spark plug 30. The exhaust port 27 of the cylinder 10 is arranged immediately above the stationary closure 18. The lower portion of the cylinder 10 is formed to provide diametrically opposed channels 31 to slidably receive the bearings 32 of the cross pin 33 which connects the piston with the connecting rod 34 associated with the crank shaft 35. Manifestly, the connecting rod 34 being associated with the crank shaft at its lower end, and to the piston 15 at is upper end through the medium of the pin 33, cannot change its position with relation to the cylinder and the closure 18 without causing a relative change of the latter.

In practice, assume that the parts are arranged as shown in Figure 1, with the piston 15 at the limit of its upstroke and about to start or move downwardly in the cylinder 10. Just as soon as the piston 15 moves in a downward direction within the cylinder 10 the ports 26 are closed by the wall of the cylinder 10 and communication between the chambers A and B cut off. The combustible mixture within the chamber B is compressed during the downward movement of the piston between the closure 16 and 18 respectively, and when the ports 26 are brought into registration with the openings 29 of the cylinders, ignition is so timed to create a spark and thus explode the combustible mixture within the piston 15. During the downward movement of the piston, the valve is open and combustible mixture drawn into the space within the cylinder 10 above the plate 16. When the piston is driven forcibly in an upward direction within the cylinder 10, incident to the explosion, within the chamber B, the combustion mixture in the chamber A is duly compressed and the valve closed. When the piston 15 travels the limit of its movement in an upward direction within the cylinder 10, the openings 26 in the piston not only establish communication between the compression chamber A and the chamber B, but the exhaust opening 28 of the piston is brought into alinement with the exhaust opening 27 of the cylinder. Consequently, when the combustible mixture under compression within the chamber A enters the piston B with considerable pressure, through the openings 26, the combustible mixture drives the burnt gases as a unit through the exhaust ports 27 and 28 respectively. As hereinabove pointed out, the valve 12 is not subjected to the heat of combustion, and therefore can be of exceptionally large cross sectional area, so that the valve is rendered very sensitive to open with a minimum pressure reduction so that the engine is highly efficient at either a high or low speed, this being due to the comparatively large opening 11 for the admittance of combustible mixture to the compression chamber A, combined with the large openings 26 and the high pressure that can be obtained within the chamber A. This arrangement permits a rapid transfer of the combustible mixture from the compression chamber A into the chamber B. The combustible mixture completely forces all of the burnt gases from the chamber B and cylinder 10 in quick order, the parts being so timed in their movements that none of the combustible mixture is allowed to escape through the exhaust ports or mix with the burnt gases in any way.

While it is believed that from the foregoing description the nature and advantages of the invention will be readily apparent, I desire to have it understood that I do not limit myself to the details herein shown and described, as the same is merely illustrative of one embodiment of the invention, and that such changes may be resorted to when desired as fall within the scope of what is claimed.

What is claimed is:—

An internal combustion engine comprising a cylinder, a hollow piston mounted for reciprocation within the said cylinder and having a closed end, a hollow closure arranged within the said piston, and means for supporting the said closure whereby the latter will automatically center or line itself within the piston, said means including relatively spaced supporting arms fixed at their lower extremities to the base of the engine and having their upper extremities presenting bearings within the said closure, a pin journaled in said bearing, and a second pin arranged at right angles to the first mentioned pin having its ends journaled in bearings in the said closure member, one of said pins presenting a transverse bore in which the other pin is journaled.

In testimony whereof I affix my signature.

ARTHUR N. FRISBIE.